(12) United States Patent
Schmidt et al.

(10) Patent No.: US 8,776,940 B2
(45) Date of Patent: Jul. 15, 2014

(54) CHASSIS FOR A ROAD MAKING MACHINE

(71) Applicant: Joseph Voegele AG, Ludwigshafen/Rhein (DE)

(72) Inventors: Thomas Schmidt, Plankstadt (DE); Tobias Gotterbarm, Limburgerhof (DE)

(73) Assignee: Joseph Voegele AG (DE)

( * ) Notice: Subject to any disclaimer, the term of this patent is extended or adjusted under 35 U.S.C. 154(b) by 0 days.

(21) Appl. No.: 13/861,019

(22) Filed: Apr. 11, 2013

(65) Prior Publication Data
US 2013/0272787 A1    Oct. 17, 2013

(30) Foreign Application Priority Data
Apr. 13, 2012  (DE) .................... 20 2012 003 756 U

(51) Int. Cl.
*B62D 51/00*       (2006.01)
(52) U.S. Cl.
USPC ............. 180/320; 180/89.1; 404/75; 404/118

(58) Field of Classification Search
USPC .......... 180/320, 324, 89.1, 89.12; 404/93, 94, 404/111, 118, 12, 75, 84.5
See application file for complete search history.

(56) References Cited

U.S. PATENT DOCUMENTS

| | | | | |
|---|---|---|---|---|
| 3,533,336 A | * | 10/1970 | Wikel | 404/111 |
| 4,376,007 A | * | 3/1983 | Eigenmann | 156/497 |
| 6,116,814 A | * | 9/2000 | Dietrichson | 404/94 |

FOREIGN PATENT DOCUMENTS

| | | | | |
|---|---|---|---|---|
| DE | 3140338 A1 | * | 4/1983 | B62D 21/00 |
| GB | 2195301 A | * | 4/1988 | B62D 49/04 |
| JP | 09137403 A | * | 5/1997 | E01C 23/16 |
| WO | WO 2005014935 A1 | * | 2/2005 | E01C 23/22 |

* cited by examiner

*Primary Examiner* — Faye M. Fleming
(74) *Attorney, Agent, or Firm* — Brooks Kushman P.C.

(57) ABSTRACT

A chassis for a road making machine comprises at least one first longitudinal beam which extends at least in sections laterally along an engine compartment of the road making machine. The longitudinal beam comprises a step which divides the longitudinal beam into an external longitudinal beam section and an internal longitudinal beam section. The internal longitudinal beam section forms a receiving area by the step in which a first cover element can be received.

18 Claims, 4 Drawing Sheets

CHASSIS FOR A ROAD MAKING MACHINE

CROSS-REFERENCE TO RELATED APPLICATIONS

This application claims foreign priority benefits under 35 U.S.C. §119(a)-(d) to German patent application number DE 20 2012 003 756.0 filed Apr. 13, 2012, which is incorporated by reference in its entirety.

TECHNICAL FIELD

The present disclosure relates to a chassis for a road making machine.

BACKGROUND

Conventionally, a chassis for a road making machine consists of longitudinal beams and crossbeams which are welded to each other to ensure a stable structure of the road making machine. In practice, the longitudinal beams and crossbeams are embodied to be continuously straight.

It is also known that side coverings are fixed to the chassis along the outer sides of the crossbeams and longitudinal beams. The side coverings are fixed on the longitudinal beams or crossbeams of the chassis with suited screwed or welded joints.

In particular in the region of the drive, the coverings attached on the chassis form a hood. It is known that the hood consists of lateral coverings which are firmly fixed along continuous longitudinal beams. In known hoods, it is problematic that a drive enclosed therein is difficult to access whereby in particular repair works are difficult to perform.

Moreover, covering constructions which are externally attached on the continuous longitudinal beams and crossbeams of the chassis occupy a lot of space.

SUMMARY

An object underlying the disclosure is to improve a chassis for a road making machine by means of simple constructive technical features, such that it permits better accessibility to an engine compartment. Moreover, it is intended that the chassis of the disclosure permits a reduced overall height of the road making machine.

The present disclosure relates to a chassis for a road making machine, comprising at least one first longitudinal beam which at least in sections extends laterally along an engine compartment of the road making machine. According to the disclosure, the longitudinal beam comprises a step which divides the longitudinal beam into an external longitudinal beam section and an internal longitudinal beam section, the internal longitudinal beam section forming a receiving area by the step in which a first cover element can be received.

The chassis according to the disclosure can have one or several cover elements coupled to it. The receiving area created by the step, in which a cover element can be easily attached without using additional fastening devices as was common up to now, is particularly suited for this.

Moreover, the chassis according to the disclosure provides improved accessibility to an engine compartment, the engine compartment being easily accessible in particular via the receiving area.

By the disclosure, a covering can be integrated in the structure of the chassis. The disclosure also permits to eliminate weighty fastening devices because cover elements can be fixed directly to the chassis.

Furthermore, an enlarged installation space for the road making machine is created by minimizing the fastening devices for the coverings.

While the chassis according to the disclosure permits an altogether compacter structure of a road making machine, it offers a very stable structure, so that it can be easily employed for all types of road making machines.

Preferably, an outer side of the internal longitudinal beam section is offset relative to an outer side of the external longitudinal beam section towards the engine compartment of the road making machine by the step. This makes it possible to fix the first cover element in a space-saving and esthetic manner to the outer side of the internal longitudinal beam section.

According to a further embodiment of the disclosure, the step comprises an oblique shoulder between the external and the internal longitudinal beam sections. This makes it possible to avoid stresses in the region of the step which have a negative influence on the strength of the chassis. The oblique shoulder rather permits to uniformly distribute stresses across the internal and external longitudinal beam sections.

An extremely stable construction of the chassis is mainly obtained if the step is integrally formed with the external and internal longitudinal beam sections. An integral design of the step with the internal and the external longitudinal beam sections can be produced, for example, by a bending process.

As an alternative, the external and internal longitudinal beam sections are preferably welded to each other by means of a lap joint to form the step. Thereby, the step can be produced in a particularly simple and inexpensive manner.

It is also advantageous for the first cover element to be detachably fixed to the chassis. This permits to easily remove the first cover element from the chassis, for example to access the engine compartment.

According to a further embodiment of the disclosure, the first cover element can be directly screwed to the chassis. By means of a screwed joint, the first cover element can be particularly securely and quickly fixed to the chassis and removed from the latter. Moreover, a screwed joint permits to repeatedly attach and remove the first cover element to the chassis or from the chassis, respectively.

Preferably, the first cover element can be received flush in the receiving area of the internal longitudinal beam section relative to the external longitudinal beam section. Thereby, the first cover element can be particularly esthetically integrated in the chassis of the road making machine. Finally, the first cover element can be particularly stably fixed to the chassis thereby. Such an attachment of the first cover element integrated in the chassis also permits to securely fix it to the chassis without any remarkable wear.

To take care of sufficient cooling of a drive located in the engine compartment, it is preferably provided for the first cover element to comprise at least one vent. Preferably, these are vents arranged one upon the other and having an oblong design. These permit a particularly effective transport of waste heat of the drive and an effective air intake of the cooler.

According to a further embodiment, the first cover element is a cover door. The cover door makes the engine compartment particularly easily accessible, for example to perform maintenance works at the drive. This makes it possible to easily access the engine compartment through the cover door from the side of the road making machine.

To be able to repeatedly open and close the cover door relative to the chassis in a simple manner, according to an advantageous embodiment, the cover door is fixed to the chassis in a pivoting manner. Thereby, the cover door provides access to the engine compartment without having to be removed from the chassis.

Preferably, the cover door can be retained with pretension against the internal longitudinal beam section, in particular against a side of the internal longitudinal beam section facing outwards. This permits to stably hold the cover door against the chassis while no undesired noise is emitted by the cover door.

It is also advantageous for the cover door to be movable between an opened and a closed position by a gas spring. By the gas spring, the cover door can also be particularly stably held in the opened and closed positions.

To prevent the cover door from unintentionally moving from a position adjacent to the chassis to an open position, the cover door may be lockable at the chassis.

To protect a further section of the engine compartment to the outside, a second cover element is fixed to the external longitudinal beam section according to a further embodiment of the disclosure.

The engine compartment is particularly easily accessible in the region of the second cover element if the latter is detachably fixed to the external longitudinal beam section. Preferably, the second cover element can be pivoted from a closed to an open position to permit access to the engine compartment without removing it from the chassis.

The disclosure also relates to a road making machine with a chassis of the type described above. In particular, the road making machine is a road finishing machine or a charger vehicle. In particular in road construction and charger vehicles, the chassis according to the disclosure revealed to be advantageous to give an operator, for example for maintenance works, improved access to the engine compartment. Moreover, the road finishing machines or charger vehicles with the chassis according to the disclosure could allow to use a reduced number of installed components. Consequently, it showed that both manufacturing costs and assembly works can be reduced.

The subject matter of the disclosure will be described more in detail with reference to the attached drawings.

DETAILED DESCRIPTION

Figure 1:
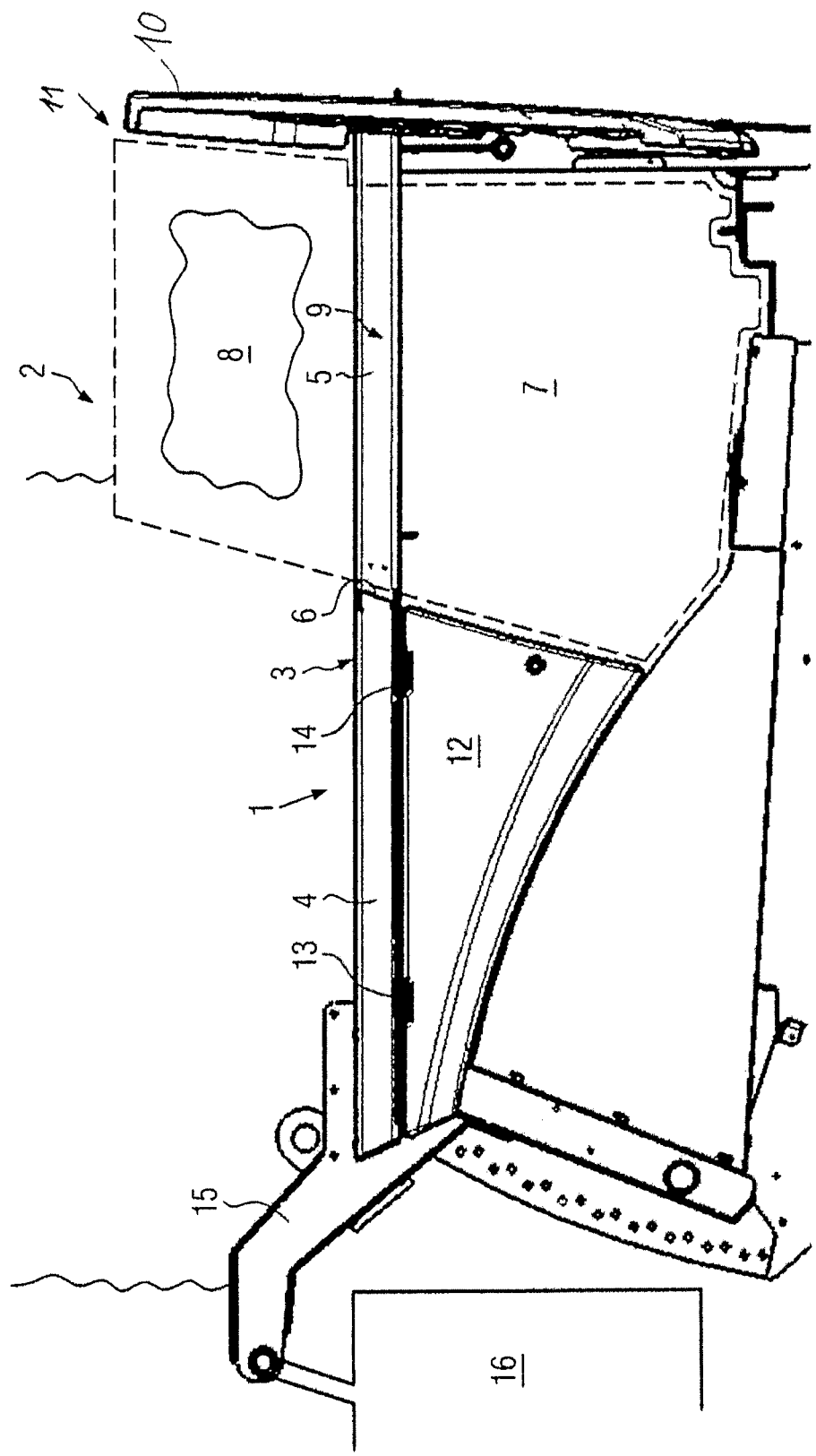
FIG. 1 shows a side view of a road making machine with the chassis according to the disclosure and an opened cover door fixed to it.

FIG. 1 shows a side view of the chassis 1 according to the disclosure which is arranged at a road making machine 2. The chassis 1 according to the disclosure comprises a longitudinal beam 3 which is mounted essentially horizontally.

The longitudinal beam 3 comprises an external longitudinal beam section 4 and an internal longitudinal beam section 5. A step 6 is provided between the external longitudinal beam section 4 and the internal longitudinal beam section 5. By the step 6, a side of the internal longitudinal beam section 5 is offset inwards relative to a side of the external longitudinal beam section 4 facing outwards into an engine compartment 7 of the road making machine 2. A drive 8 is disposed in the engine compartment 7 of the road making machine 2.

The longitudinal beam 3 forms a receiving area 9 along the internal longitudinal beam section 5. In the receiving area 9, a cover door 10 can be received. In FIG. 1, the cover door 10 is in an open position in which it provides direct access to the drive 8 disposed in the engine compartment 7. Moreover, in FIG. 1 the cover door 10 is shown in a dashed line as it is disposed in a closed position relative to the chassis 1. The cover door 10 is disposed in the receiving area 9 of the chassis 1.

According to FIG. 1, the cover door 10 is fixed to the chassis 1 as a first cover element 11. Moreover, FIG. 1 shows a second cover element 12 which is fixed to the external longitudinal beam section 4 of the longitudinal beam 3. The second cover element 12 is fixed to the external longitudinal beam section 4 by a first bearing 13 and a second bearing 14. The second cover element 12 is fixed to the external longitudinal beam section 4 such that it does not cover the latter.

FIG. 1 also shows a lateral mounting support 15 to which a screed 16 is fixed.

Figure 2:
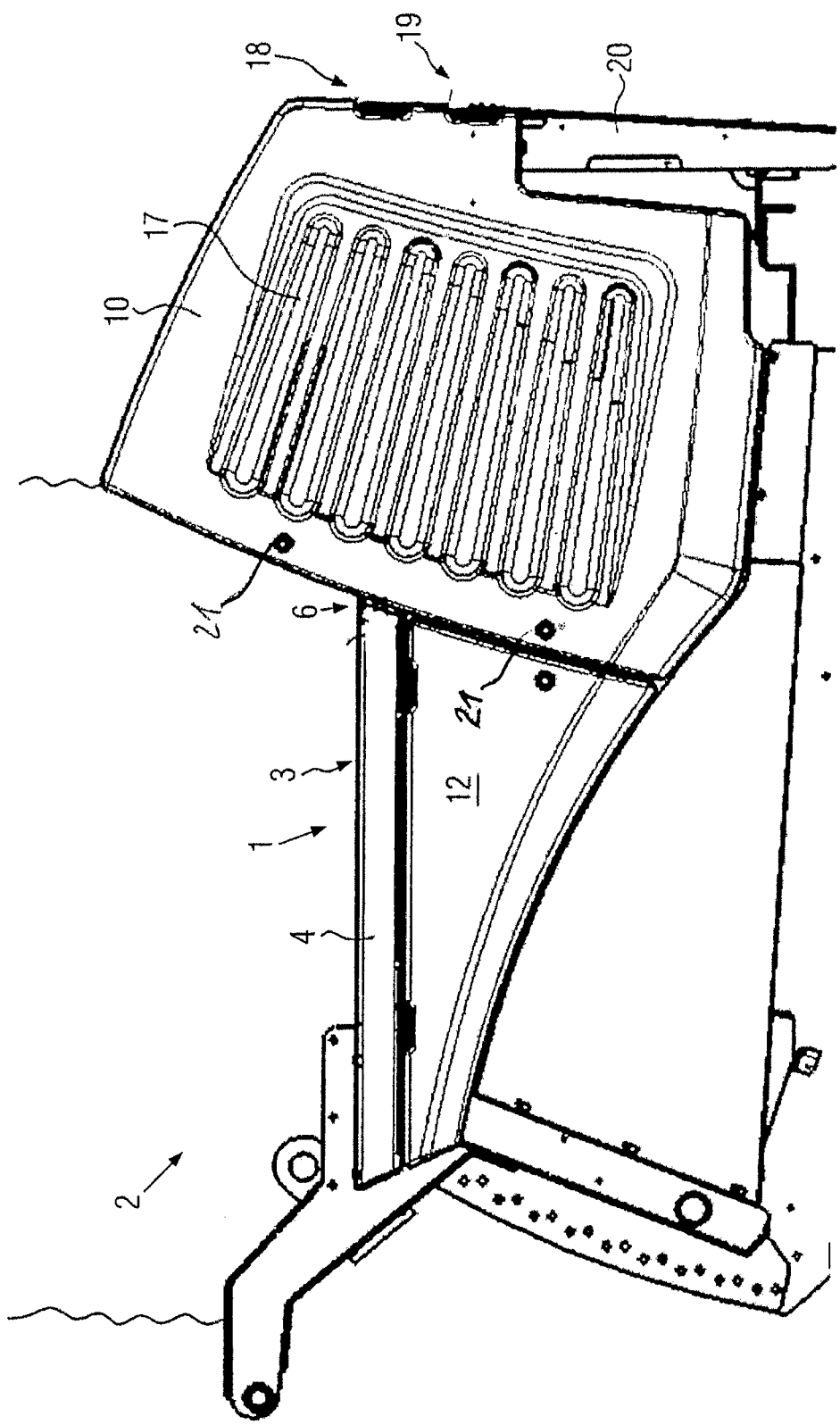
FIG. 2 shows a side view of a road making machine with the chassis according to the disclosure and a closed cover door fixed to it.

FIG. 2 shows a side view of the chassis 1 according to the disclosure which can be employed for the road making machine 2. According to FIG. 2, the cover door 10 is in a closed position. In the closed position, the cover door 10 is disposed in the receiving area 9 formed by the step 6.

The cover door 10 in FIG. 2 comprises several oblong vents 17 arranged one upon the other and being provided for ensuring sufficient cooling of the drive 8 disposed in the engine compartment 7.

The cover door 10 is fixed to the chassis 1 by third and fourth bearings 18, 19. The bearings 18, 19 can each be, for example, a hinge. In particular, the cover door 10 is fixed to a front wall 20 of the chassis 1 oriented vertically with respect to the longitudinal beam 3 by the third and fourth bearings 18, 19. The cover door 10 is pretensioned in the receiving area 9 against the internal longitudinal beam section 5 of the longitudinal beam 3 by means of a gas spring 28 (see FIG. 3).

FIG. 2 also shows a locking mechanism 21 which is provided at the cover door 10. With the locking mechanism 21, the cover door 10 can be locked in the receiving area 9 when the cover door 10 is in its closed position in the receiving area 9.

Figure 3:
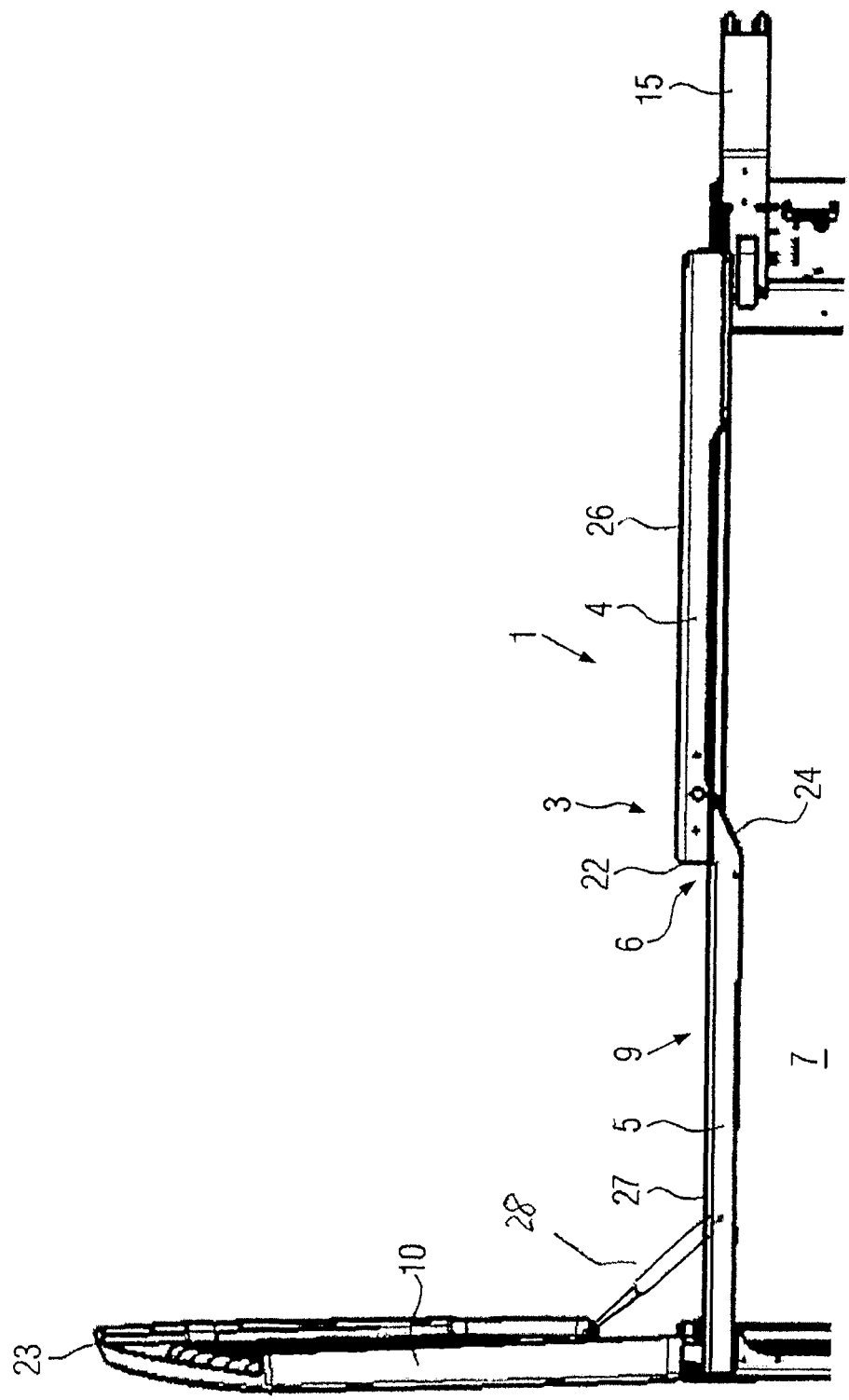
FIG. 3 shows a plan view of the chassis according to the disclosure with an opened cover door.

FIG. 3 shows a plan view of the chassis 1 according to the disclosure. The cover door 10 is in its open position relative to the chassis 1. When the cover door 10 is in its open position, the engine compartment 7 is easily accessible from outside.

A gas spring 28 is fixed between the internal longitudinal beam section 5 and the cover door 10. The gas spring 28 retains the cover door 10 pretensioned in the open position. The gas spring 28 also permits to retain the cover door 10 in a pretensioned manner in the closed position according to FIG. 4.

The step 6 comprises a first step section 22 which is oriented vertically relative to the outer side 26 of the external longitudinal beam section 4 and relative to the outer side 27 of the internal longitudinal beam section 5 which is offset to the inside. The first step section 22 is provided for receiving an outer edge 23 of the cover door 10.

Moreover, FIG. 3 shows a second step section 24 which extends obliquely relative to an inner side of the external longitudinal beam section 4 and relative to an inner side of the internal longitudinal beam section 5 which is offset to the inside.

Figure 4:
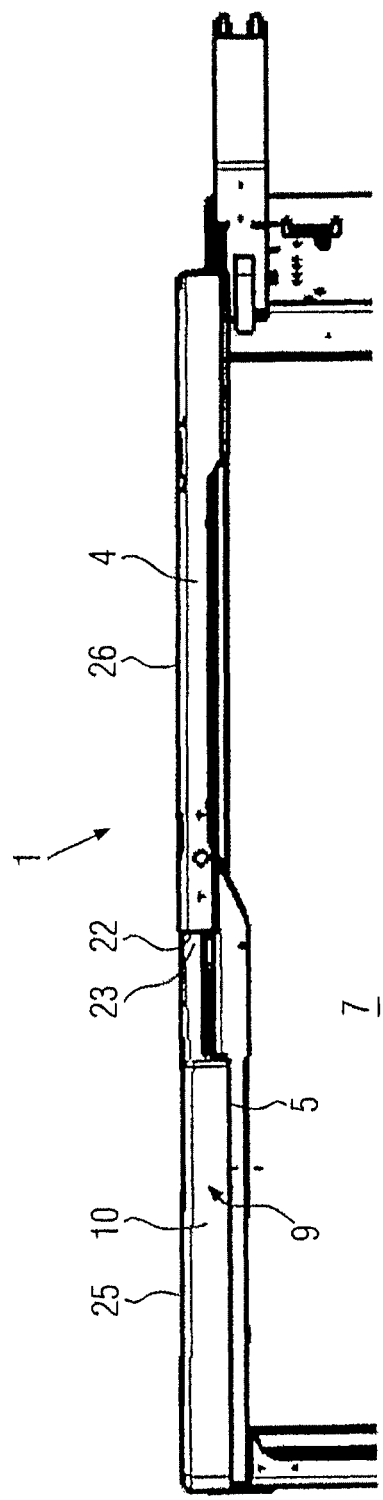
FIG. 4 shows a plan view of the chassis according to the disclosure with a closed cover door.

FIG. 4 shows a plan view of the chassis 1 according to the disclosure in which the cover door 10 is in its closed position relative to the chassis 1. In the closed position, the cover door 10 is disposed in the receiving area 9 of the internal longitudinal beam section 5. Moreover, the outer edge 23 of the cover door 10 is located in the first step section 22 of the step 6.

FIG. 4 moreover shows that an outer side 25 of the cover door 10 extends flush relative to an outer side 26 of the external longitudinal beam section 4. This permits to arrange the cover door 10 in a particularly esthetic manner at the chassis 1 of the disclosure.

In accordance with the disclosure, the first cover element 11, which is represented as a cover door 10 according to FIGS. 1 to 4, can be integrated in the structure of the chassis according to the disclosure. The disclosure permits to employ the chassis 1 itself as bearing construction for cover elements.

The disclosure also permits to obtain particular good access to an interior of the engine compartment, thereby facilitating in particular maintenance works.

The chassis according to the disclosure can be employed at all road making machines. It is moreover absolutely conceivable to moreover employ the chassis according to the disclosure advantageously at agricultural machines and at transport vehicles, for example trucks.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A chassis and cover element combination for a road making machine, the combination comprising:
   a chassis including at least one first longitudinal beam that is configured to extend at least in sections laterally along an engine compartment of the road making machine, the longitudinal beam comprising a step which divides the longitudinal beam into an external longitudinal beam section and an internal longitudinal beam section, the internal longitudinal beam section forming a receiving area by the step; and
   a first cover element that is receivable in the receiving area.

2. The combination according to claim 1 wherein an outer side of the internal longitudinal beam section is offset inwardly relative to an outer side of the external longitudinal beam section by the step.

3. The combination according to claim 1 wherein the step comprises an oblique step section between the external and the internal longitudinal beam sections.

4. The combination according to claim 1 wherein the step is integrally formed with the external and the internal longitudinal beam sections.

5. The combination according to claim 1 wherein the external and the internal longitudinal beam sections are welded to each other by means of a lap joint to form the step.

6. The combination according to claim 1 wherein the first cover element is detachably fixed to the chassis.

7. The combination according to claim 1 wherein the first cover element can be directly screwed to the chassis.

8. The combination according to claim 1 wherein the first cover element is receivable flush in the receiving area of the internal longitudinal beam section relative to the external longitudinal beam section.

9. The combination according to claim 1 wherein the first cover element comprises at least one vent.

10. The combination according to claim 1 wherein the first cover element comprises a cover door.

11. The combination according to claim 10 wherein the cover door is pivotally connected to the chassis.

12. The combination according to claim 10 wherein the cover door is configured to be retained with pretension against the internal longitudinal beam section.

13. The combination according to claim 10 further comprising a gas spring for moving the cover door between an opened position and a closed position.

14. The combination according to claim 10 wherein the cover door is lockable at the chassis.

15. The combination according to claim 1 further comprising a second cover element connected to the external longitudinal beam section.

16. The combination according to claim 15 wherein the second cover element is detachably fixed to the external longitudinal beam section.

17. A chassis for a road making machine, the chassis comprising:
   at least one first longitudinal beam which is configured to extend at least in sections laterally along an engine compartment of the road making machine, the longitudinal beam comprising a step which divides the longitudinal beam into an external longitudinal beam section and an internal longitudinal beam section, the internal longitudinal beam section forming a receiving area by the step in which a first cover element can be received.

18. A road making machine comprising:
   an engine compartment;
   a chassis including at least one first longitudinal beam which extends at least in sections laterally along the engine compartment, the longitudinal beam comprising a step that divides the longitudinal beam into an external longitudinal beam section and an internal longitudinal beam section, the internal longitudinal beam section forming a receiving area by the step; and
   a first cover element that is receivable in the receiving area.

* * * * *